United States Patent [19]
Boese et al.

[11] 3,870,942
[45] Mar. 11, 1975

[54] NON-POLLUTION MOTOR WITH GAS TUBE CONDUCTORS

[76] Inventors: Harold L. Boese, 7020 William Dr.; Thomas R. Hencey, Jr., P.O. 3119, both of Galveston, Tex. 77550

[22] Filed: Aug. 27, 1973

[21] Appl. No.: 391,544

Related U.S. Application Data

[63] Continuation-in-part of Ser. No. 273,684, Aug. 21, 1972, , which is a continuation-in-part of Ser. No. 106,651, Jan. 15, 1971, abandoned, which is a continuation-in-part of Ser. No. 94,814, Dec. 3, 1970, Pat. No. 3,681,609.

[52] U.S. Cl. .................. 320/2, 290/50, 310/54, 318/139, 320/61, 322/DIG. 1, 339/15
[51] Int. Cl. ...................... F16l 11/12, H02j 7/00
[58] Field of Search ............ 320/2, 15, 61; 339/15, 339/16 RC, 16 R, 117 R; 60/36; 290/50; 310/54; 180/65; 318/139; 322/DIG. 1

[56] References Cited
UNITED STATES PATENTS

| | | | |
|---|---|---|---|
| 2,479,705 | 8/1949 | True | 320/15 |
| 3,614,493 | 10/1971 | Collings | 310/54 |
| 3,648,082 | 3/1972 | MacNab | 310/54 |
| 3,681,609 | 8/1972 | Boese et al. | 290/50 X |
| 3,749,814 | 7/1973 | Pratt | 339/15 X |

*Primary Examiner*—J. D. Miller
*Assistant Examiner*—Robert J. Hickey
*Attorney, Agent, or Firm*—Clarence A. O'Brien; Harvey B. Jacobson

[57] ABSTRACT

Non-pollution power plant wherein a cryogenic fluid cools an electric drive motor and/or electric generator driven by a gas motor operated by flow of the evaporated cryogenic fluid therethrough. Tubular conduits conduct the cryogenic fluid as well as electrical current to the drive motor from batteries charged by the generator.

14 Claims, 5 Drawing Figures

NON-POLLUTION MOTOR WITH GAS TUBE CONDUCTORS

This invention relates to the generation of power without exhaust of atmospheric pollutants and this application is a continuation-in-part of our prior copending application, U.S. Ser. No. 273,684, filed July 21, 1972, which is a continuation-in-part of Ser. No. 106,651, filed Jan. 15, 1971, now abandoned, which in turn is a continuation-in-part of Ser. No. 94,814, filed Dec. 3, 1970, now Pat. No. 3,681,609.

A non-polluting power plant deriving energy from evaporation of a liquefied cryogenic fluid is disclosed in our prior copending application aforementioned and in its parent application now U.S. Pat. No. 3,681,609. In such power plants, there is no combustion and therefore no exhaust of combustion products which are the usual source of atmospheric pollution. Instead, a liquefied cryogenic fluid is evaporated and the gas conducted through a gas motor to drive a generator charging storage batteries from which a drive motor is energized. In order to improve the operating characteristics and efficiency of such a power plant, the liquefied cryogenic fluid is conducted in heat exchange relation to the drive motor and the generator for cooling the same. It is therefore an important object of the present invention to further improve the operating characteristics and efficiency of the foregoing type of non-polluting power plant.

In accordance with the present invention, the liquefied cryogenic gas in the aforementioned type of power plant is conducted between the cooling coil and the evaporator through continuous tubing made of electrically conductive conduit sections. The conduit sections are connected electrically to the terminals of the drive motor and the batteries in order to conduct electrical energizing current through the drive motor for operation thereof. The conduit sections are interconnected by insulating connectors so as to electrically separate portions of the tubing and thereby establish energizing circuits through which current is conducted unidirectionally. The liquefied cryogenic gas is conducted through the tubing through which electrical current is also conducted resulting in withdrawal of electrical energy from the batteries under cold temperature conditions and a significant reduction in the power consumption from the batteries as well as significantly extended battery life.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
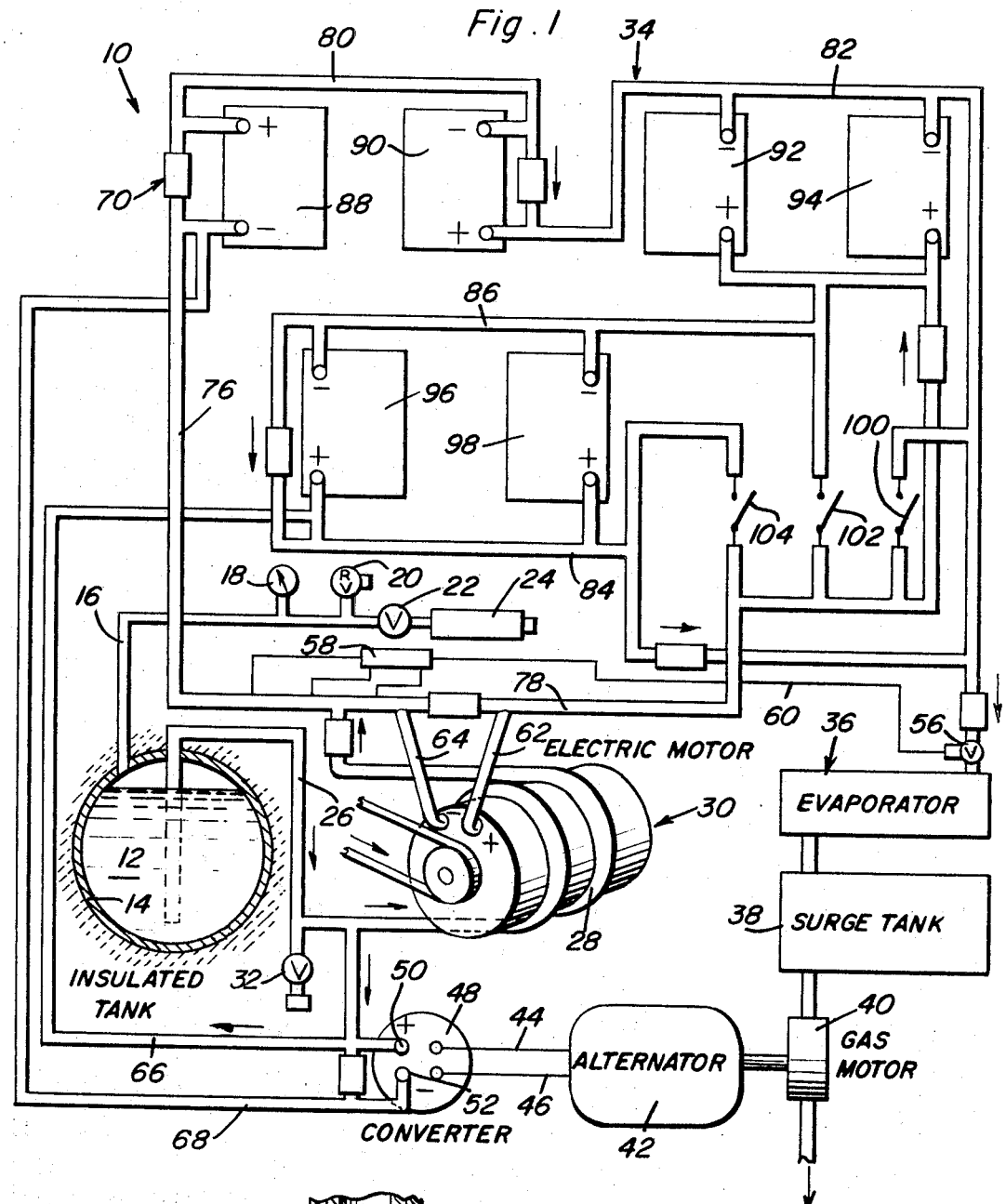
FIG. 1 is a schematic diagram of the fluid and electrical circuits associated with the system of the present invention.

Referring now to the drawings in detail, FIG. 1 is a combination fluid flow and electrical circuit diagram of a preferred embodiment of the invention representing a power plant generally referred to by reference numeral 10. A liquefied cryogenic fluid 12 such as nitrogen, air, argon, carbon dioxide, is disposed in an insulated tank 14. A conduit 16 connected to the upper portion of the tank 14 above the body of liquefied fluid 12, is connected to a pressure indicator 18, a relief valve 20 through which excess fluid pressure is vented and a selectively operable valve 22. The outlet of the valve 22 is connected to atmosphere through a muffler 24 and is selectively opened to relieve gas pressure within tank 14 by venting, the muffler 24 serving to reduce the noise level during such operation.

A conduit 26 extends from the bottom of the tank 14 immersed within the fluid 12 for conducting the liquefied fluid through a cooling coil 28 disposed in heat exchange relation to the casing of an electric drive motor 30. The motor 30 delivers mechanical power from the power plant and while operating, any heat generated by the motor is absorbed by the liquid cryogenic fluid. A normally closed filler valve 32 is connected to the conduit 26 for the purpose of recharging the tank 14 with a supply of the cryogenic fluid when the tank has become depleted.

The heat exchange coil 28 is connected by continuous tubing generally referred to by reference numeral 34 to an evaporator 36 within which the cryogenic liquid conducted thereto is evaporated to form a cryogenic gas delivered to a surge tank 38. Gas from the surge tank is conducted through a gas motor 40 and then exhausted. The gas motor 40 drives an alternator or generator 42, the electrical output of which is delivered by conductors 44 and 46 to an a.c. to d.c. converter 48. A source of d.c. voltage is thereby established at the positive and negative terminals 50 and 52 of the converter.

Figure 3:
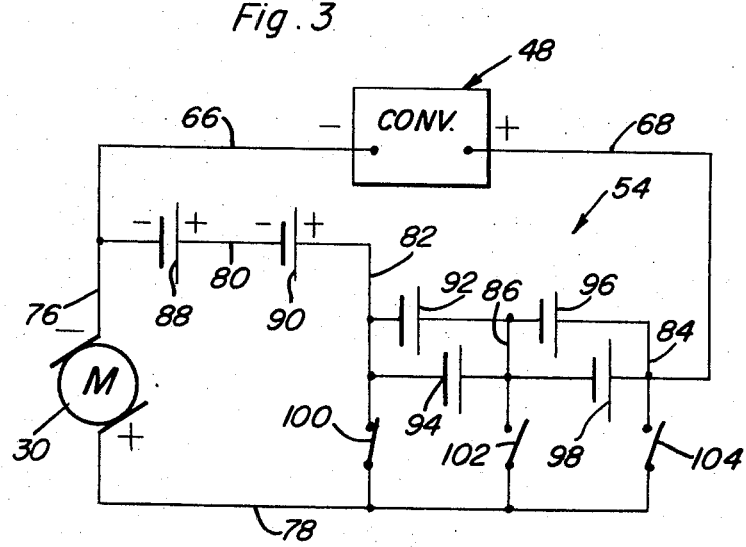
FIGS. 3, 4 and 5 represent an electrical circuit diagram corresponding to the system depicted in FIG. 1, shown in different operating conditions.

The d.c. voltage output of the converter is applied to the terminals of a storage battery assembly 54 as diagrammatically depicted in FIG. 3 for example, in order to charge the same. The storage battery assembly is in turn connected to the positive and negative terminals of the drive motor 30 for energizing the same. Thus, the system so far described, is similar in operation to the power plants disclosed in our prior patent and copending application aforementioned. However, in accordance with the present invention, the cryogenic fluid in a liquid state not only cools the drive motor 30 but additionally receives heat from the terminals of the storage battery assembly 54 as it is conducted through the tubing 34 from the coil 28 to the evaporator 36, as shown in FIG. 1 in a manner to be described in detail hereafter. The cryogenic fluid passes from the tubing 34 into the evaporator through a solenoid operated valve 56 that is controllably opened and closed by a temperature control element 58 electrically connected to the solenoid operated valve by conductor 60. The temperature control element 100 is electrically connected to the tubing 34 and responds to the temperature of the cryogenic fluid in the tubing for control of the solenoid operated valve 56. Thus, when the cryogenic fluid rises in temperature above a predetermined value, the valve 56 opens in order to increase flow through the coil 28 in order to maintain the temperature of the operating drive motor 30 at a desired low value. The valve 56 on the other hand, is closed under control of the temperature control element 100 when the temperature of the cryogenic fluid in tubing 34 drops below a predetermined value in order to reduce the flow of cryogenic liquid through the tubing. The drive motor 30 is thereby maintained operating at a low optimum operating temperature.

The tubing 34 establishes a continuous flow path for the cryogenic fluid between the heat exchange coil 28 and the evaporator 36 as aforementioned and also establishes energizing circuits for the drive motor from the storage battery assembly 54 that is charged from the source of d.c. voltage at the positive and negative terminals 50 and 52 of the converter 48. The positive and negative terminals of the drive motor 30 are therefore respectively connected to the tubing 34 by conduit sections 62 and 64 while conduit sections 66 and 68 interconnect the positive and negative terminals 50 and 52 of the converter with the storage battery assembly. The conduit sections 62, 64, 66 and 68 connected to the terminals of the drive motor and converter, are made of an electrically conductive material such as copper in order to conduct the flow of current as well as to bring the cryogenic fluid in the continuous tubing 34 into heat transfer relationship to the terminals of the drive motor and the converter.

Figure 2:
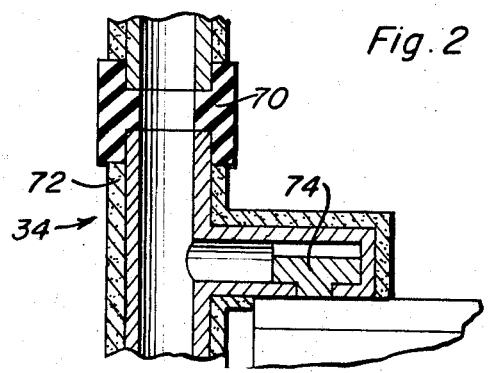
FIG. 2 is a partial sectional view through a portion of the fluid tubing showing the connections between conduit sections and to a battery terminal.

The tubing 34 is made up of a plurality of separate conduit sections interconnected by insulating connectors 70. As more clearly seen in FIG. 2, each of the insulating connectors 70 will interconnect adjacent ends of conduit sections so as to electrially separate the same while confining fluid flow so as to prevent fluid leakage between the adjacent conduit sections. The tubing 34 where exposed may be surrounded by insulation 72 to avoid unintended heat transfer relative to the cryogenic fluid. Heat transfer is however accommodated between the cryogenic fluid and the terminals 74 of the batteries in the battery storage assembly 54 as shown in FIG. 2 to which the tubing 34 is connected. These tubing connections not only permit the cryogenic fluid to cool the battery terminals but also establish electrical connections to the battery terminals.

As shown in FIG. 1, the tubing 34 includes a conduit section 76 to which the negative terminal of the drive motor 30 is electrically connected by conduit section 64 non-conductively separated by a connector from a conduit section 78 to which the positive terminal of the drive motor is electrically connected by conduit section 62. An insulating connector also connects the outlet side of the heat exchange coil 28 to the conduit section 76 so that the cryogenic fluid may enter the tubing 34 through conduit section 76 and flow into the other conduit sections of the tubing. Conduit section 76 is connected by a connector 70 to a conduit section 80 which in turn is connected by another connector to a conduit section 82 to which the electromagnetically operated valve 56 is connected by a connector. Conduit section 82 is also connected by another connector to a conduit section 84. Finally, a conduit section 86 is interconnected by a pair of connectors 70 at opposite ends thereof to the conduit sections 84 and 78 completing the assembly of tubing 34.

The aforementioned conduit sections of the tubing 34 are connected to the positive and negative terminals of a plurality of batteries in the battery storage assembly 54 as shown in FIG. 1. In the illustrated embodiment, there are three pairs of batteries for a total of six batteries. One pair of batteries 88 and 90 are interconnected in series by the conduit section 80 to which the positive and negative terminals of the batteries 88 and 90 are connected respectively. The negative terminal of battery 88 is electrically connected by the conduit section 76 to the negative terminal of the drive motor 30 and by conduit section 68 to the negative terminal 52 of the converter. The positive terminal of battery 90 on the other hand is electrically connected to conduit section 82 to which the negative terminals of batteries 92 and 94 are connected. Thus, the batteries 92 and 94 form a pair of parallel connected batteries connected in series with the pair of batteries 88 and 90 by the conduit section 82. The positive terminals of the batteries 92 and 94 are in turn interconnected with the conduit section 86 to which a second pair of parallel connected batteries 96 and 98 are connected at their negative terminals. The positive terminals of the batteries 96 and 98 are in turn interconnected with the conduit section 84 and to the positive terminal 50 of the converter by means of conduit section 66. The conduit sections 82, 86 and 84 also respectively terminate at switch contacts associated with three switches 100, 102, 104. The pivoted switch arms of these switches are in turn all interconnected with the conduit section 78 so as to selectively complete an energizing circuit through the drive motor 30.

The switches 100, 102 and 104 are selectively closed in order to control the speed of the drive motor by selecting the number of batteries connected across its positive and negative terminals. When switch 100 is closed as shown in FIG. 3, and switches 102 and 104 are opened, current flows from the positive terminal of the motor 30 through the conductor conduit sections 78 and 82 and through the series connected batteries 90 and 88 to the negative terminal of the motor completing an energizing circuit for the motor the speed of which is determined by the output power of the batteries 88 and 90. The flow of cryogenic fluid through the conduit sections on the other hand, is generally in a direction opposite to the symbolic direction of current flow from positive to negative terminals or in the same direction as actual electron flow. This occurs because the fluid exiting from the outlet side of the coil 28 will proceed in a direction through the tubing 34 toward the operating batteries 88 and 90 through conduit section 76 because of the heat produced at the terminals of these batteries, the other batteries being inactive.

Figure 4:
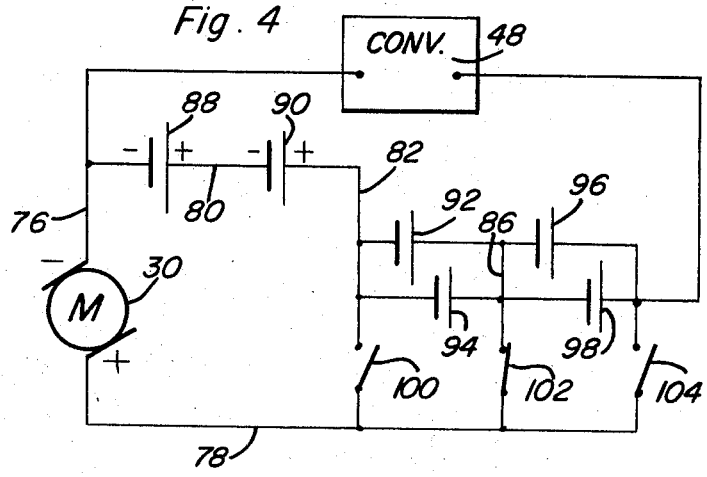

When the switch 102 is closed and the other switches are open as shown in FIG. 4, an energizing circuit is completed through the drive motor 30 from its positive terminal through conductor conduit section 78, switch 102 and conductor section 86 connected to the positive terminals of the batteries 92 and 94 to complete a circuit through the parallel connected batteries 92 and 94 and the series connected batteries 88 and 90. The two pair of batteries are interconnected by conductor conduit section 82 which forms part of the energizing circuit together with conduit sections 80 and 76. Thus, only the batteries 96 and 98 are omitted from the energizing circuit when the switch 102 is closed for operation of the drive motor at an intermediate speed.

Figure 5:
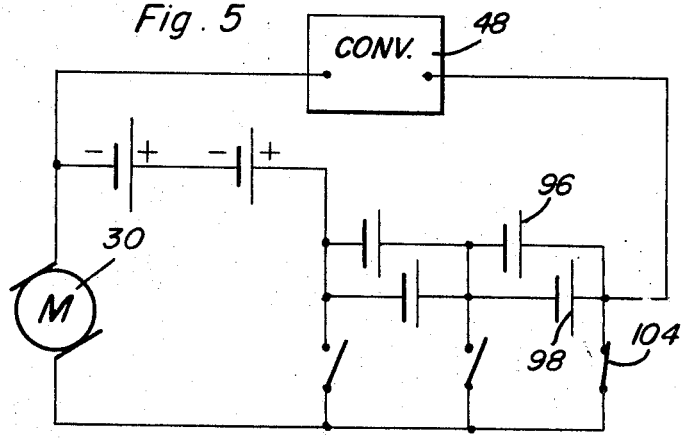

High speed operation of the drive motor 30 is obtained by closing of the switch 104 with the switches 100 and 102 open as shown in FIG. 5. All six batteries are then in the energizing circuit. The series connected batteries 88 and 90 are then connected in series with the parallel connected pairs of batteries.

For reasons not fully understood, the output voltage and current of the batteries is higher than expected as compared to systems hereinbefore disclosed in our prior patent and copending application. It is theorized that the cold temperature condition under which the batteries operate because of the heat removed from the batteries by the cryogenic fluid as well as the conductivity of the fluid itself as an electron or negative charge carrier in the direction of electron flow accounts for the improved operating characteristics. An additional unexpected result is also obtained because of the foregoing arrangement of the invention in that at least some of the batteries become reversed as to polarity during operation so that they are in fact charged instead of being dishcarged. Therefore, during operation of the power plant in accordance with the condition illustrated in FIG. 3, all six batteries will become discharged if the connections to the converter 48 are disconnected whereas only the parallel connected pairs of batteries become discharged when operating in the condition illustrated in FIG. 4 with the switch 102 closed. With switch 104 closed as shown in FIG. 5, only batteries 96 and 98 become discharged when the connections to the converter 48 are disconnected. In view of the foregoing phenomenon, those batteries not under discharging bias during operation are not subject to deterioration and the life of the storage battery assembly is thereby significantly extended.

As hereinbefore stated, any suitable cryogenic fluid may be utilized as the working medium or fuel for the power plant. These fluids include liquid air, liquid nitrogen, liquid argon, liquid cripton, liquid neon as well as materials such as Freon and alcohols. Although the cryogenic fluid is shown conducted in heat exchange relation to the drive motor, it will be appreciated that it could also be conducted in heat exchange relation to the generator as in the case of the arrangement disclosed in our prior copending application aforementioned. Further, the concept of utilizing a flow of cryogenic fluid to remove heat from operating batteries by flow through tubing through which the electrical energizing circuits are also established, may be applied to installations other than the particular type of power plant described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a source of liquefied cryogenic fluid conducted in heat exchange relation to an electric motor energized from battery storage means charged by a generator, means for conducting electrical energy from the battery storage means to the electric motor, including a plurality of tubing sections made of electrically conductive material, insulating connector means interconnecting said tubing sections in electrically non-conductive relation to each other for establishing a continuous flow path between the battery storage means and the electric motor to exhaust for the cryogenic fluid, and means connecting the electrically conductive tubing sections to the electric motor and the battery storage means for conducting unidirectional current through the electric motor.

2. The combination of claim 1 wherein said cryogenic fluid absorbs heat from the electric motor and the battery storage means.

3. The combination of claim 2 wherein said battery storage means includes a plurality of batteries, at least one pair of said batteries being interconnected in series and another pair of said batteries being interconnected in parallel, said series connected and parallel connected pairs of batteries being connected in series to the electric motor and switch means connected to the electric motor for alternatively completing a motor energizing circuit through both pairs of said batteries or through the series connected pair of batteries in bypass relation to the parallel connected pair of batteries.

4. The combination of claim 3 wherein the battery storage means further includes converter means connected to the generator for establishing a source of d.c. voltage connected across both pairs of interconnected batteries.

5. The combination of claim 1 wherein said battery storage means includes a plurality of batteries, at least one pair of said batteries being interconnected in series and another pair of said batteries being interconnected in parallel, said series connected and parallel connected pairs of batteries being connected in series to the electric motor and switch means connected to the electric motor for alternatively completing a motor energizing circuit through both pairs of said batteries or through the series connected pair of batteries in bypass relation to the parallel connected pair of batteries.

6. The combination of claim 5 wherein the battery storage means further includes converter means connected to the generator for establishing a source of d.c. voltage connected across both pairs of interconnected batteries.

7. In combination with a battery source of electrical energy and an electrodynamic device, a source of cryogenic fluid, a heat exchanger, conduit means including portions respectively interconnecting the source of fluid with the heat exchanger, the battery source and the source and the electrodynamic device, said portion connecting the battery source to the electrodynamic device; conducting electrical current to the electrodynamic device through the conduit means while the cryogenic fluid is absorbing heat from the battery source.

8. The combination of claim 7 wherein said conduit means includes a plurality of tubing sections made of electrically conductive material, and insulating connector means interconnecting said tubing sections in electrically non-conductive relation to each other for limiting flow of electrical current unidirectionally while establishing a continuous flow path for the cryogenic fluid.

9. The combination of claim 8 wherein said conduit means conducts the cryogenic fluid in heat transfer relation to the electrodynamic device.

10. The combination of claim 9 wherein said heat exchanger is an evaporator.

11. The combination of claim 10 wherein said battery source comprises a plurality of batteries, at least one pair of said batteries being interconnected in series and another pair of said batteries being interconnected in parallel, said series connected and parallel connected pairs of batteries being connected in series to the electrodynamic device and switch means connected to the electrodynamic device for alternatively completing an energizing circuit through both pairs of said batteries or through the series connected pair of batteries in bypass relation to the parallel connected pair of batteries.

12. The combination of claim 7 wherein said conduit means conducts the cryogenic fluid in heat transfer relation to the electrically energized device.

13. The combination of claim 12 wherein said heat exchanger is an evaporator.

14. The combination of claim 7 wherein said battery source comprises a plurality of batteries, at least one pair of said batteries being interconnected in series and another pair of said batteries being interconnected in parallel, said series connected and parallel connected pairs of batteries being connected in series to the electrically energized device and switch means connected to the electrically energized device for alternatively completing an energizing circuit through both pairs of said batteries or through the series connected pair of batteries in by-pass relation to the parallel connected pair of batteries.

* * * * *